Jan. 2, 1968 W. I. KAYE 3,361,027
SPECTROPHOTOMETER
Filed Feb. 26, 1963 2 Sheets-Sheet 1

INVENTOR.
WILBUR I. KAYE
BY HIS ATTORNEYS
HARRIS, KIECH, RUSSELL & KERN

Jan. 2, 1968

W. I. KAYE 3,361,027

SPECTROPHOTOMETER

Filed Feb. 26, 1963

INVENTOR.
WILBUR I. KAYE
BY HIS ATTORNEYS
HARRIS, KIECH, RUSSELL & KERN

United States Patent Office 3,361,027
Patented Jan. 2, 1968

3,361,027
SPECTROPHOTOMETER
Wilbur I. Kaye, Fullerton, Calif., assignor to Beckman Instruments, Inc., a corporation of California
Filed Feb. 26, 1963, Ser. No. 261,118
11 Claims. (Cl. 88—14)

This invention relates to apparatus and methods for measuring polarization characteristics of samples.

The characteristics of samples when excited by light having various planes of polarization and the intensity of radiation of samples along various polarization planes are of significance in the analysis and identification of various materials. It is generally customary to express the polarization of a solution in terms of the polarization ratio $p$ which may be expressed as:

$$p = \frac{I_{11} - I_1}{I_{11} + I_1}$$

where $I_{11}$ is the intensity of the radiation having its electric vector vibrating parallel to the plane of polarization of the exciting light and $I_1$ is the intensity of the radiation having its electric vector vibrating perpendicular to this plane. If unpolarized exciting light is utilized, the polarization ratio $p_n$ is defined as $$p_n = \frac{p}{2-p}$$

It is often desirable to determine the polarization ratio of radiation passing a sample as a function of wavelength. The prior art methods of obtaining polarization spectra have been slow inasmuch as it has been the general practice to set the polarizer for measuring $I_{11}$ and scanning the entire spectrum, then rotating the polarizer 90° such that $I_1$ may be measured and again scanning the spectrum over the same wavelength region. Inasmuch as it may require as much as twenty or thirty minutes to several hours to complete a scan of the spectrum depending upon the wavelength region and the particular instrument utilized, it is apparent that the time necessary to obtain sufficient information to allow calculation of the polarization ratio is double that required to complete a scan. Since considerable time lapses between the reading in one plane at one wavelength and the reading in the other plane at the same wavelength errors introduced by transient conditions within the system are introduced in the determination of the polarization ratio.

It is a principal object of this invention to provide a rapid, semi-automatic method of obtaining polarization spectra from which the polarization ratio as a function of wavelength may conveniently be determined. Another object is to provide an improved apparatus for obtaining the polarization spectra under conditions of constant energy while the wavelength and plane of polarization of the excitation radiation are varied.

A more specific object of the present invention is to provide a device for recording the polarization modulated spectrum of a sample.

Another object is to provide a means for the rapid, semi-automatic recording of the polarization spectra of a sample in an instrument operating upon the double beam principles.

Another object of the present invention is to provide various methods of operating a spectrophotometer both with and without a reference material to obtain polarization characteristics of a sample.

The invention also comprises novel combinations and arrangements of parts and steps, which will more fully appear in the course of the following description. The drawings merely show and the description merely describes preferred embodiments of the present invention which are given by way of illustration or example.

Figure 1:
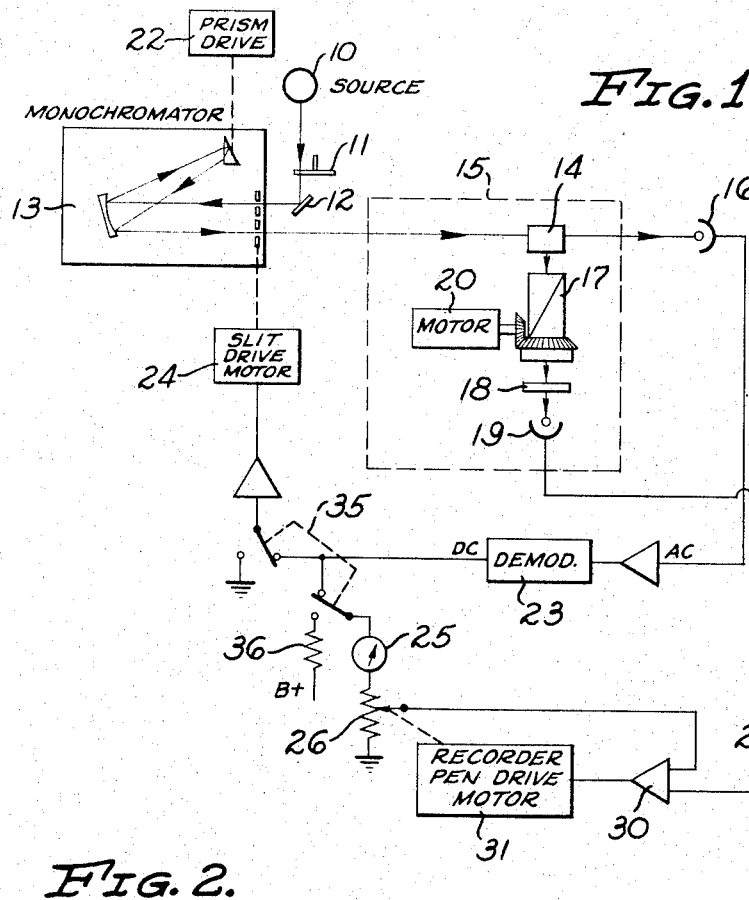
FIG. 1 is a diagram of a preferred form of the instrument.

The preferred form of the instrument shown in FIG. 1 includes a radiation source 10, a beam chopper or modulator 11, and a mirror 12 for directing a modulated beam through the entrance slit of the monochromator 13. The beam from the exit slit of the monochromator is directed through a sample cell 14 in a cell holder 15 to a detector 16. A polarization unit 17, a filter 18, and another detector 19 are mounted in the cell holder 15 along a light path from the cell to the detector at an angle to the path from the monochromator to the cell, usually at a 90° angle.

The beam chopper 11 may be a motor-driven apertured disk which interrupts the beam at a suitable frequency, typically 480 cycles per second. The entrance and exit beams in the monochromator are shown side by side for purposes of clarity. Ordinarily, the entrance and exit beams will be disposed one above the other to permit usage of a single pair of slit jaws. The monochromator 13 sorts or disperses the radiation of the source to provide a narrow band of radiation at the cell holder, and this narrow band may be scanned over a wide spectrum by rotating the prism with a prism drive 22. Of course, other types of monochromators may be utilized, various filters may be utilized, and radiation sources may be used directly, depending upon the type of excitation desired for the measurement being carried out.

The polarization unit 17 permits transmission of light therethrough in the plane of polarization of the unit so that radiation in the path from the cell to the detector is polarized in a plane. Various conventional polarizing devices may be utilized and a Glan-Thompson prism is preferred for this embodiment. The polarization unit is mounted for rotation about its light axis so that the plane of polarization can be varied. The polarization unit may be rotated manually or by a drive motor 20. In operation, the polarization unit 17 has maximum transmittance for light polarized in the plane of polarization of the unit and minimum transmission for light polarized at 90° to the plane of polarization of the unit.

Another polarization unit may be mounted between the monochromator and the sample cell for initially polarizing the incident light. However, it has been found that the sample cell itself will effectively polarize the light in the vertical plane so that the initial polarization unit may be omitted. The filter 18 may be used for certain types of measurements and omitted in others. The particular characteristics of the filter are selected depending upon the measurement being conducted. For example, if it is desired to measure the fluorescence of a sample, the filter will be selected to reject the light of the wavelength of the excitation radiation and pass light of the wavelength of the fluorescence.

The electrical signal produced at the detector 16 is amplified and directed to a demodulator 23. The output of the demodulator, normally referred to as the reference signal, is normally connected through an amplifier to a slit-drive motor 24 which controls the slit sizes and hence the energy in the beam to the sample cell. This slit-width control circuit provides for constant energy in the excitation path through the cell and thereby compensates for variations in source output and variations in instrument efficiency at different wavelengths. The reference signal from the demodulator 23 is also normally connected through an indicating meter 25 and a potentiometer 26 to the circuit ground.

The electrical signal produced at the detector 19 is amplified and directed to another demodulator 27 to provide the sample signal. The output of the demodulator 27 is connected to a potentiometer 28 and the arm of a second potentiometer 29 to circuit ground. The potentiometers 26, 28 provide the inputs to a differential amplifier 30 for energizing a pen drive motor 31. The pen drive motor drives the marking pen of a suitable chart recorder and the arm of the potentiometer 26 providing a feedback connection to the input of the amplifier 30. When operated as shown in FIG. 1, the recorder provides a record of the ratio of the radiation along the path to the tector 19 and along the path to the detector 16. The potentiometer 28 provides for setting the 100% point on the ratio recording scale and the potentiometer 29 provides for setting the zero point on the ratio recording scale.

A switch 35 in the output circuit of the demodulator 23 provides for disconnecting the slit-drive motor and amplifier and the pen drive motor and amplifier from the reference signal. The input to the slit-drive motor amplifier is connected to circuit ground and the meter 25 and potentiometer 26 are connected to a reference voltage through a resistor 36 when the switch 35 is actuated. When the switch 35 is so actuated, the sample signal which varies the function of the energy at the detector 19 provides the only input signal to the amplifier 30 and hence the recorder signal is a direct measure of the energy of radiation arriving at the detector 19.

In a typical analysis, the sample is placed in the cell, the monochromator prism drive is adjusted to provide radiation at the desired wavelength, the switch 35 is thrown to the reverse of the position shown in FIG. 1, and the polarization unit is varied, usually by rotation through 360°. Using a filter providing a pass band in the fluorescence range of the sample, this mode of operation provides a measure of the degree of polarization of sample fluorescence. Using a filter providing a pass band at the wavelength of the excitation, this mode of operation provides a measure of the degree of polarization of the light scattered by the sample.

In another mode of operation, the polarization unit 17 may be set at a particular angle and the variation in scattering or fluorescence radiation measured as a function of time. In another alternative mode, the polarization unit may be maintained stationary and the monochromator scanned over a spectrum.

In another alternative mode of operation, the instrument may be used to provide a measure of the degree of polarization and a spectrum of excitation simultaneously. The polarization unit is rotated continuously by the motor and the monochromator is simultaneously scanned over its spectrum. Preferably the polarization unit will be operated to provide a number of cycles during the monochromator's scan. In a specific example, the polarization unit may be rotated at four revolutions per minute during a monochromator scan which requires about twenty minutes. In this mode of operation, the polarization unit modulates the conventional spectrum pattern with the percentage of modulation providing a measure of the degree of polarization at various wavelengths.

The instrument may be operated in the various modes described above with the switch 35 in the position shown in FIG. 1. The slit-width of the monochromator is varied to maintain the energy at the detector 16 constant so that the measurements are independent of source fluctuation. Also, the output at the recorder is the ratio of the signal from the detector 19 relative to that from the detector 16.

Figure 2:
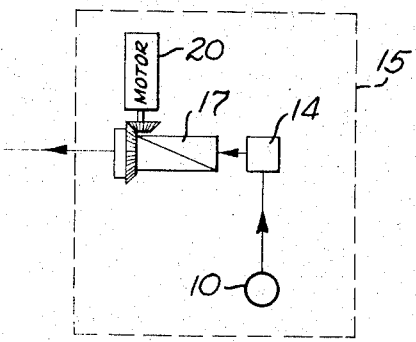
FIGS. 2 and 3 are diagrams of alternative forms of the cell section of the instrument of FIG. 1.

A number of variaions in the arrangement of the elements of the instrument of FIG. 1 may be made to permit additional modes of polarization characteristic measurements. One such modification is illustrated in FIG. 2, wherein the source 10 and the detector 19 have been interchanged and the polarization unit 17 has been positioned in the path between the sample cell 14 and the monochromator 13. This form of the instrument permits measurement of the degree of polarization and the spectra of fluorescence or scattering of a sample. With the polarization unit being rotated continuously during a scan of the monochromator, a simultaneous measurement of degree of polarization and sample fluorescence or scattering spectrum is achieved as described above in connection with FIG. 1.

Figure 3:
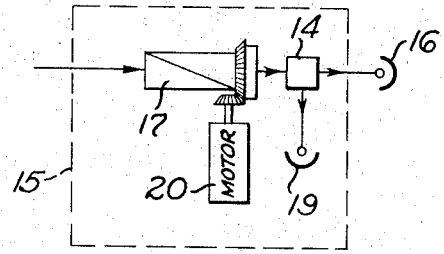

In another alternative arrangement, the instrument may be operated as shown in FIG. 3 using only the detector 19, with the polarization unit 17 disposed between the monochromator and the sample cell and with the switch 35 thrown to the reverse of the position shown in FIG. 1. The polarization unit may be fixed with its plane of polarization at ninety degrees to that produced by the cell to provide a measure of depolarized excitation spectra.

Another alternative mode may utilize the arrangement shown in FIG. 3, with the output of the detector 16 connected through an amplifier to the sample demodulator 27 and with the detector 19 inoperative. The detector 16 then provides a measure of the transmittance of the sample as a function of the plane of polarization and the wavelength of the excitation of the sample. The polarization unit may be fixed or may be rotated continuously.

Figure 4:
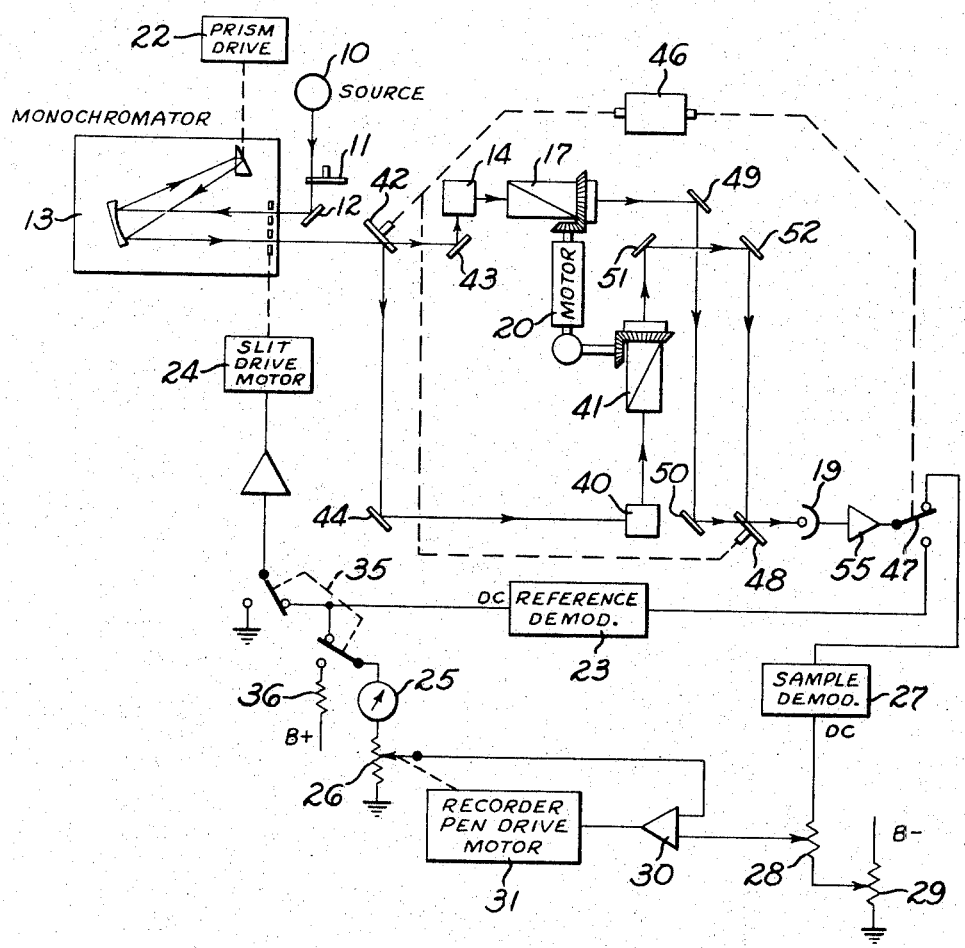
FIG. 4 is a diagram of an alternative form of the instrument.

FIG. 4 illustrates an alternative form of the instrument in which components corresponding to those of the instrument of FIG. 1 are identified by the same reference numerals. A reference cell unit comprising a cell 40 and polarization unit 41 is provided adjacent the sample cell unit. The polarization units 17, 41 are arranged to be rotated in synchronism to provide the same plane of polarization for light in the path from the sample cell and light in the path from the reference cell. This may be accomplished by driving both polarization units from the motor 20.

The beam from the exit slit of the monochromator 13 is directed to a rotating half mirror 42 and along alternate paths via mirrors 43 and 44 to the sample cell 14 and reference cell 40 respectively. The mirror 45 is driven by a motor 46 which also drives a commutator 47 and another half mirror 48 in synchronism with the half mirror 43. Radiation from the sample cell 14 is directed along a path to the detector including the polarization unit 17, mirrors 49, 50 and the rotating mirror 48. Similarly, the polarization unit 41, mirrors 51, 52 and the half mirror 48 define a path from the cell 40 to the detector. Typically this beam switching system may be identical to that of a conventional dual beam spectrophotometer.

The electrical signal from the detector 19 is amplified in an amplifier 55 and alternately directed to the sample demodulator 27 and the reference demodulator 23 by the commutator 47. That portion of the amplified signal due to radiation received from the sample cell 14 is directed to the sample demodulator, and that portion of the signal due to radiation from the reference cell 40 is directed to the reference demodulator. With this arrangement, the energy in the path from the reference cell is maintained substantially constant by control of the slit width of the monochromator. Also, the recorded output is the ratio of the energy in the path from the sample cell and the energy in the path from the reference cell. In an alternative arrangement, the commutator 47 and rotating mirror 48 could be omitted with the signals from two detectors coupled to the corresponding demodulators through separate amplifiers. The polarization units can be set to particular angles or can be rotated during the scanning of the monochromator. For the latter mode, the response time of the slit-drive servo system should be slow with respect to the rate of rotation of the prisms so that the rotating prisms can effectively modulate the beams.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an instrument for polarized light measurement, the combination of:
   a radiation source;
   a sample cell;
   a radiation detector converting radiation impinging thereon to an electrical signal for recording;
   means defining an incident light path from said source to said sample cell and including a monochromator for dispersing incident radiation from said source;
   said detector positioned to receive radiation from said cell along a second light path from said cell to said detector at an angle to said incident path;
   a polarization unit positioned in said incident path between said monochromator and cell for polarizing light passing therethrough in a plane; and
   means continuously rotating said polarization unit about its light axis for varying the angle of the plane of polarization.

2. In an instrument for polarized light measurement, the combination of:
   a radiation source;
   a sample cell;
   a radiation detector converting incident radiation to an electrical signal for recording;
   means defining an incident light path from said source to said sample cell and including a monochromator for dispersing incident radiation from said source;
   said detector positioned to receive radiation from said cell along a second light path from said cell to said detector in line with said incident path;
   a polarization unit mounted in said incident path between said monochromator and cell for polarizing light passing therethrough in a plane; and
   means continuously rotating said polarization unit about its light axis for varying the angle of the plane of polarization.

3. In an instrument for polarized light measurement, the combination of:
   a radiation source;
   a sample cell;
   means defining an incident light path from said source to said sample cell;
   a radiation detector positioned to receive radiation from said cell along a second path from said cell to said detector and providing an electrical output signal that is a function of the incident radiation;
   a polarization unit positioned in said second light path for polarizing light passing therethrough in a plane;
   a monochromator mounted in said second light path between said polarization unit and detector for dispersing entering radiation into a narrow band; and
   means continuously rotating said polarization unit about its light axis for varying the angle of the plane of polarization.

4. In an instrument for polarized light measurement, the combination of:
   a radiation source;
   a sample cell;
   a first radiation detector for providing an electrical signal varying as a function of incident radiation;
   a second radiation detector for providing an electrical signal varying as a function of incident radiation;
   means defining an incident light path from said source through said sample cell to said first detector;
   said second detector positioned to receive radiation from said cell along a second light path from said cell to said second detector at an angle to said incident path;
   a polarization unit positioned in said second path for polarizing light passing therethrough in a plane; and
   means continuously rotating said polarization unit about its light axis for varying the angle of the plane of polarization.

5. In an instrument for polarized light measurement, the combination of:
   a radiation source;
   a sample cell;
   a first radiation detector for providing a reference electrical signal varying as a function of incident radiation;
   a second radiation detector for providing a sample electrical signal varying as a function of incident radiation;
   means defining an incident light path from said source through said sample cell to said first detector and including a monochromator for dispersing incident radiation from said source;
   a slit jaw motor for varying the beam slit size in said monochromator;
   circuit means having said reference signal as an input for driving said slit jaw motor to maintain the reference signal substantially constant;
   said second detector positioned to receive radiation from said cell along a second light path from said cell to said second detector at an angle to said incident paths;
   a polarization unit mounted in said second path for polarizing light passing therethrough in a plane; and
   means continuously rotating said polarization unit about its light axis for varying the angle of the plane of polarization.

6. In an instrument for polarized light measurement, the combination of:
   a radiation source;
   a sample cell;
   a first radiation detector for providing a reference electrical signal varying as a function of incident radiation;
   a second radiation detector for providing a sample electrical signal varying as a function of incident radiation;
   means defining an incident light path from said source through said sample cell to said first detector and including a monochromator for dispersing incident radiation from said source;
   a slit jaw motor for varying the beam slit size in said monochromator;
   first circuit means having said reference signal as an input for driving said slit jaw motor to maintain the reference signal substantially constant;
   said second detector positioned to receive radiation from said cell along a second light path from said cell to said second detector at an angle to said incident paths;
   a polarization unit positioned in said second light path for polarizing light passing therethrough in a plane;
   means continuously rotating said polarization unit about its light axis for varying the angle of the plane of polarization;
   recorder drive means; and
   second circuit means having said reference and sample signals as inputs for driving said recorder drive means to record the ratio of said signals.

7. In an instrument for polarized light measurement, the combination of:
   a radiation source;
   a sample cell;
   a first radiation detector for providing an electrical signal varying as a function of incident radiation;
   a second radiation detector for providing an electrical signal varying as a function of incident radiation;
   means defining an incident light path from said source through said sample cell to said first detector;
   said second detector positioned to receive radiation from said cell along a second light path from said cell to said second detector at an angle to said incident path;

a monochromator mounted in one of said paths for dispersing entering radiation into a narrow band;

a polarization unit mounted in one of said paths for polarizing light passing therethrough in a plane; and means continuously rotating said polarization unit about its light axis for varying the angle of the plane of polarization.

8. In an instrument for polarized light measurement, the combination of:

a radiation source;

a sample cell;

a reference cell;

radiation detector means for producing a sample electrical signal varying as a function of incident radiation from said sample cell and a reference electrical signal varying as a function of incident radiation from said reference cell;

a first polarization unit for polarizing light passing therethrough in a plane;

a second polarization unit for polarizing light passing therethrough in a plane;

a beam switcher including means for directing radiation from said source alternately along a first path to said sample cell, first polarization unit and detector means, and along a second path to said reference cell, second polarization unit and detector means; and means for rotating said polarization units in synchronism and about their respective light axes for simultaneously varying the angle of the plane of polarization of each.

9. In an instrument for polarized light measurement, the combination of:

a radiation source;

a sample cell;

a reference cell;

radiation detector means for producing a sample electrical signal varying as a function of incident radiation from said sample cell and a reference electrical signal varying as a function of incident radiation from said reference cell;

a first polarization unit associated with said sample cell for polarizing light passing said unit in a plane;

a second polarization unit associated with said reference cell for polarizing light passing said unit in a plane;

a beam switcher including means for directing radiation from said source alternately along a first path to said sample cell and along a second path to said reference cell;

a monochromator positioned between said source and said beam switcher;

a slit jaw motor for varying the beam slit size in said monochromator;

means for rotating said polarization units in synchronism and about their respective light axes for simultaneously varying the angle of the plane of polarization of each;

first circuit means having said reference signal as an input for driving said slit jaw motor to maintain the reference signal substantially constant;

recorder drive means; and second circuit means having said reference and sample signals as inputs for driving said recorder drive means to record the ratio of said signals.

10. In an instrument for polarized light measurement, the combination of:

a radiation source;

a sample cell;

a monochromator;

a radiation detector;

means defining an incident light path from said source to said sample cell and including said monochromator;

said radiation detector positioned to receive radiation from said sample cell along a second light path at an angle to said incident path;

polarization means positioned in one of said light paths for polarizing light passing therethrough in a plane; and means continuously rotating said polarization unit about its light axis for varying the angle of the plane of polarization.

11. In an instrument for polarized light measurement, the combination of:

a radiation source;

a sample cell;

a radiation detector providing an output signal as a function of incident radiation;

means defining an incident light path from said source to said sample cell;

said detector positioned to receive radiation from said sample cell along a second light path from said cell to said detector at an angle to said incident path;

a polarization unit mounted in one of said light paths for polarizing light passing therethrough in a plane;

a monochromator positioned in one of said light paths for dispersing radiation passing said path;

means scanning the output of said monochromator for providing a narrow band of radiation along said light path;

means continuously rotating said polarization unit about its light axis; and means recording the output of said radiation detector as a function of wavelength of said monochromator output.

References Cited

UNITED STATES PATENTS

| | | | |
|---|---|---|---|
| 2,167,484 | 7/1939 | Berry | 250—225 |
| 2,973,684 | 3/1961 | Nisle | 88—14 |
| 3,022,704 | 2/1962 | Cary | 88—14 |
| 3,065,640 | 11/1962 | Langmuir et al. | 88—14 |
| 3,164,662 | 1/1965 | Grosjean et al. | 88—14 |
| 3,197,694 | 7/1965 | Cunningham | 88—14 |
| 3,242,796 | 3/1966 | Strickler | 88—14 |

JEWELL H. PEDERSEN, *Primary Examiner.*

DAVID H. RUBIN, *Examiner.*

D. R. STEVENS, B. LACOMIS, *Assistant Examiners.*